_United States Patent Office_

2,908,689
Patented Oct. 13, 1959

2,908,689

NEW COMPLEX FORMED BY THE INTERACTION OF 5-NITRO-2-FURALDEHYDE AND 2-OXAZOLIDONE

Gabriel Gever, Oxford, N.Y., assignor to The Norwich Pharmacal Company, Norwich, N.Y., a corporation of New York No Drawing. Application September 30, 1958
Serial No. 764,238

1 Claim. (Cl. 260—307)

This invention relates to a new chemical composition which is a complex formed by the interaction of 5-nitro-2-furaldehyde and 2-oxazolidone, and may be represented by the formula:

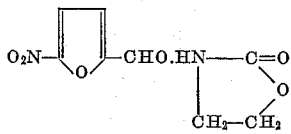

My new complex is useful as an intermediate in the preparation of pharmacologically effective nitrofurans; e.g., N-(5-nitro-2-furfurylidene)-1-aminohydantoin (U.S. Patent No. 2,610,181); N - (5 - nitro - 2 - furfurylidene)-3-amino-2-oxazolidone (U.S. Patent No. 2,759,932); and 5-nitro-2-furaldehyde semicarbazone (U.S. Patent No. 2,416,234). I have discovered that my new complex can be prepared in pure form and in good yield by a method which can be carried out very easily.

It is, of course, known that 5-nitro-2-furaldehyde is a valuable intermediate in the preparation of the aforementioned pharmacologically effective compounds. However, that aldehyde is a relatively unstable chemical compound being very photosensitive. It gradually darkens in the presence of light and eventually becomes resinous with the loss of the —NO₂ radical. It cannot be stored for any appreciable length of time because its photosensitivity results in the formation of contaminating decomposition products. Resort to purification procedures is objectionably time consuming and expensive.

Furthermore, 5-nitro-2-furaldehyde has a low melting point (35–36° C.) so that precautions must be taken to avoid melting at temperatures frequently encountered. Subsequent resolidification at lower temperatures produces a hard, difficulty handled mass.

I have discovered that 5-nitro-2-furaldehyde can be placed in a state wherein it is stable and very easily handled and at the same time readily available for use as an intermediate in the preparation of the nitrofurans referred to above by complexation with 2-oxazolidone.

My new complex, prepared by causing 5-nitro-2-furaldehyde and 2-oxazolidone to interact in the presence of water at a temperature of from about 45–50° C. to form a 1:1 molar adduct, is a free flowing, crystalline solid having a melting point (135–140° C.) well above temperatures reasonably encountered and having none of the light sensitive properties of 5-nitro-2-furaldehyde. Thus it may be kept for long periods without change.

When my new complex is heated in the presence of water at a temperature of about 90–100° C. the components thereof, 5-nitro-2-furaldehyde and 2-oxazolidone, are regenerated thus making that aldehyde available for interaction with carbonyl derivatizing agents, e.g., 1-amino-hydantoin, 3-amino-2-oxazolidone and semicarbazide, thereby producing, respectively, N-(5-nitro-2-furfurylidene) - 1 - aminohydantoin, N - (5 - nitro - 2 - furfurylidene)-3-amino-2-oxazolidone and 5-nitro-2-furaldehyde semicarbazone.

The method of preparing the above-mentioned pharmacologically effective substances, which I prefer, consists of adding the appropriate carbonyl derivatizing agent to an aqueous solution, heated to about 90–100° C., of my new complex. Within a very brief time condensation takes place between 5-nitro-2-furaldehyde and the carbonyl derivatizing agent. Upon cooling, the product is obtained in high yield.

In order that my invention may be fully available to those skilled in the art, the following illustrative examples are given.

EXAMPLE I

To a solution of 25 g. of 2-oxazolidone in 100 cc. of water is added 25 g. of 5-nitro-2-furaldehyde and the mixture is stirred at about 45–50° C. for about 15 minutes. After cooling to about 2–10° C., the mixture is filtered. The solid is washed with 100 cc. of cold water followed by 2×100 cc. portions of ether. After drying, 23.2 g. (57%) of my new complex, M.P. 135–140° C., is obtained. A further 13.7 g. (34%) of my new complex is obtained upon concentrating the filtrate. My new complex may be recrystallized from ethyl alcohol. Its $$E_{1\,cm.}^{1\%} = 524 \text{ at } 3100A$$

Analysis

|  | C | H | N |
|---|---|---|---|
| Calc'd | 42.11 | 3.53 | 12.28 |
| Found | 42.25 | 3.26 | 12.21 |

EXAMPLE II

To an aqueous medium containing 1 gm. of my new complex (Example I) is added 0.5 gm. of semicarbazide hydrochloride and two drops of concentrated hydrochloric acid and the mixture heated at 90–100° C. for about five minutes. The mixture is cooled to about 2–10° C. and filtered. The solid obtained, 5-nitro-2-furaldehyde semicarbazone, weighs 0.85 gm. (98% yield); M.P. ca. 233° C. with decomposition.

EXAMPLE III

The procedure of Example II is followed except that 1-aminohydantoin is used instead of semicarbazide hydrochloride. There is obtained N-(5-nitro-2-furfurylidene)-1-aminohydantoin, 0.95 gm. (91%); M.P. 266–267° C. with decomposition.

EXAMPLE IV

The procedure of Example II is followed except that 3-amino-2-oxazolidone is used instead of semicarbazide hydrochloride. There is obtained N-(5-nitro-furfurylidene)-3-amino-2-oxazolidone; 0.9 gm. (91%); M.P. 256–257° C. with decomposition.

What I claim is:

A composition, comprising a complex formed by the interaction of 5-nitro-2-furaldehyde and 2-oxazolidone, represented by the formula:

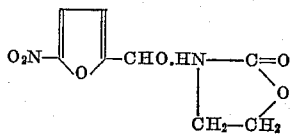

No references cited.